United States Patent [19]

Perry

[11] Patent Number: 4,504,947
[45] Date of Patent: Mar. 12, 1985

[54] PCM SUPERVISION DATA REFORMATTING CIRCUIT

[75] Inventor: Thomas J. Perry, Phoenix, Ariz.

[73] Assignee: GTE Automatic Electric Incorporated, Northlake, Ill.

[21] Appl. No.: 506,573

[22] Filed: Jun. 22, 1983

[51] Int. Cl.³ .............................................. H04J 3/00
[52] U.S. Cl. .................................... 370/99; 370/110.1
[58] Field of Search ............... 370/99, 58, 110.1, 100, 370/68

[56] References Cited

U.S. PATENT DOCUMENTS 4,191,857  3/1980  McLaughlin et al. ............ 370/110.1
4,271,509  6/1981  Brolin .............................. 370/110.1

Primary Examiner—Douglas W. Olms
Assistant Examiner—Frank M. Scutch, III
Attorney, Agent, or Firm—Frank J. Bogacz; Peter Xiarhos

[57] ABSTRACT

In a PCM switching system having a CPU controlled switching network, a reformatting circuit is connected between the switching network and a number of digital spans. The reformatting circuit converts supervisory data which is serially received to parallel data words which may be readily accessed by the CPU. The supervisory data is logically ordered and stored in a memory for CPU access.

12 Claims, 6 Drawing Figures

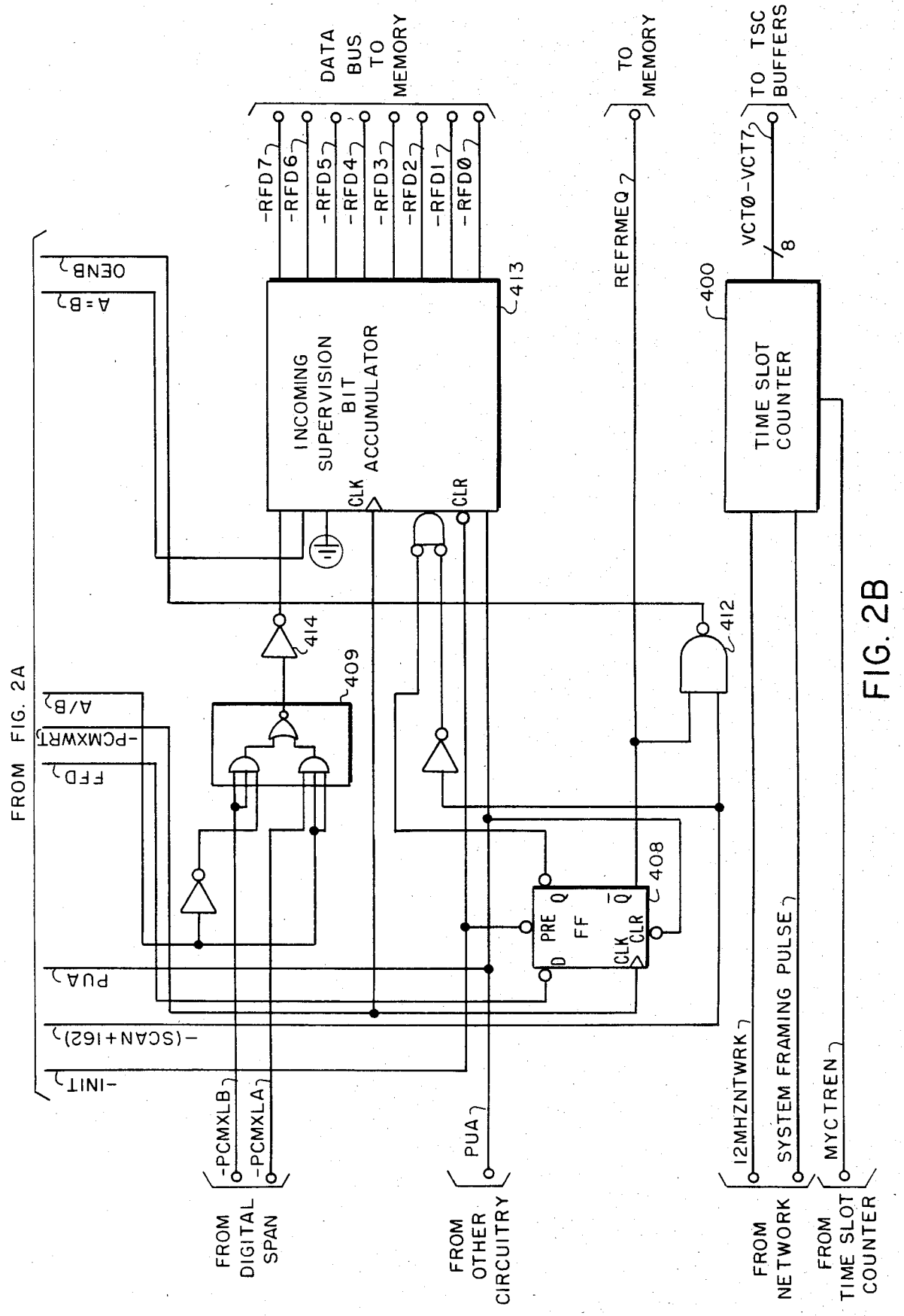

|   | 7 | 6 | 5 | 4 | 3 | 2 | 1 | 0 |
|---|---|---|---|---|---|---|---|---|
| GRP 00 | CH7 | CH6 | CH5 | CH4 | CH3 | CH2 | CH1 | CH0 |
| GRP 01 | CH15 | CH14 | CH13 | CH12 | CH11 | CH10 | CH9 | CH8 |
| GRP 10 | CH23 | CH22 | CH21 | CH20 | CH19 | CH18 | CH17 | CH16 |
| GRP 11 |  |  | UNDEFINED |  |  |  |  |  |

FIG. 4

| MEMORY ADDRESSES | | | |
|---|---|---|---|
| 000 | FORMAT SHOWN IN FIG. 4 | A | SPAN 0 |
| 001 | | | |
| 002 | | | |
| 003 | | | |
| 008 | GRP 00 | B | |
| 009 | GRP 01 | | |
| 00A | GRP 10 | | |
| 00B | GRP 11 | | |
| 080 | GRP 00 | A | SPAN 1 |
| 081 | GRP 01 | | |
| 082 | GRP 10 | | |
| 083 | GRP 11 | | |
| 088 | GRP 00 | B | |
| 089 | GRP 01 | | |
| 08A | GRP 10 | | |
| 08B | GRP 11 | | |
| 100 | | | SPANS 2-6 |
| 30B | | | |
| 310 | GRP 00 | A | SPAN 7 |
| 311 | GRP 01 | | |
| 312 | GRP 10 | | |
| 313 | GRP 11 | | |
| 318 | GRP 00 | B | |
| 319 | GRP 01 | | |
| 31A | GRP 10 | | |
| 31B | GRP 11 | | |

FIG. 5

PCM SUPERVISION DATA REFORMATTING CIRCUIT

BACKGROUND OF THE INVENTION

The present invention pertains to transmission of supervision data between PCM switching systems and more particularly to circuitry for reformatting the supervision data to a form readily accessible and useable by a central processing unit which controls a switching system.

In a per-channel signaling arrangement for PCM data transmission, the least significant bit of particular data samples is utilized to transmit supervisory data. Typically, digital span data is transmitted in a unit termed a time frame. The time frame includes a synchronization bit and 24 channels of PCM information. Each channel is an 8-bit representation of a particular PCM data sample.

A collection of 12 time frames is termed a super time frame. During the 6th and 12th time frames of each super time frame, the least significant bit of each channel is deleted. In place of this deleted bit, supervision data is included. The supervision data transmitted is an A supervision bit and a B supervision bit. During the 6th time frame of each super time frame, an A supervision bit is inserted into the least significant bit of each channel. During the 12th time frame of each super frame, a B supervision bit is inserted into the least significant bit position of each channel.

The switching system that receives the supervision data must detect and store this data. Typically, this supervision information (the A and B supervision bits) is stored one channel (one supervision bit) per address location. This is ideal for processing by the switching network. However, it is undesirable for software scanning since it would take 192 read operations to scan the supervisory status of each of the channels of up to 8 digital spans.

Accordingly, it is the object of the present invention to provide a PCM supervision data reformatting circuit which orders the supervision data such that, a minimum number of CPU memory accesses may be made to examine the supervision data.

SUMMARY OF THE INVENTION

In a PCM telecommunications switching system a plurality of digital spans are connected to the switching system for data transmission. The switching system includes a central processing unit (CPU). The present invention is a PCM supervision data reformatting circuit. A and B supervision bits are transmitted as the PCM supervision data.

The reformatting circuit is connected to each of the plurality of digital spans for receiving the PCM supervision data. A time slot counter produces a plurality of time slot signals, which indicate the identity of the particular digital span and the identity of the particular channel within the particular span, for which the reformatting circuit is presently receiving the PCM supervision data (A and B supervision bits).

Controller apparatus operates cyclically, once for each complete cycle of the time slot counter to produce a group of control signals. These control signals indicate first, which particular digital span is presently having its data formatted by the reformatting circuit; and second, the control signals whether the incoming supervision data is presently an A supervision bit or a B supervision bit.

Formatting apparatus is connected to the time slot counter, to the digital spans via receiving leads and to the controller apparatus. The formatting apparatus operates in response to a bit-for-bit concurrence of the present time slot signal with the signals of the controller apparatus, indicating the particular digital span which the formatting apparatus is operating on at the present time. For this concurrence, the formatter apparatus repeatedly collects a plurality of A supervision bits or a plurality of B supervision bits. The formatter apparatus, then, forms CPU words from the collection of the A or B supervision bits for transmission to the switching system's CPU.

BRIEF DESCRIPTION OF THE DRAWING

FIGS. 2A & 2B are a schematic diagram of the reformatting circuit embodying the principles of operation of the present invention.

FIG. 4 is a memory diagram depicting the A or B supervision bits for one particular digital span.

FIG. 5 is a memory diagram depicting the storage of all A and B supervision bits for each of eight digital spans.

DESCRIPTION OF THE PREFERRED EMBODIMENT

Figure 1:
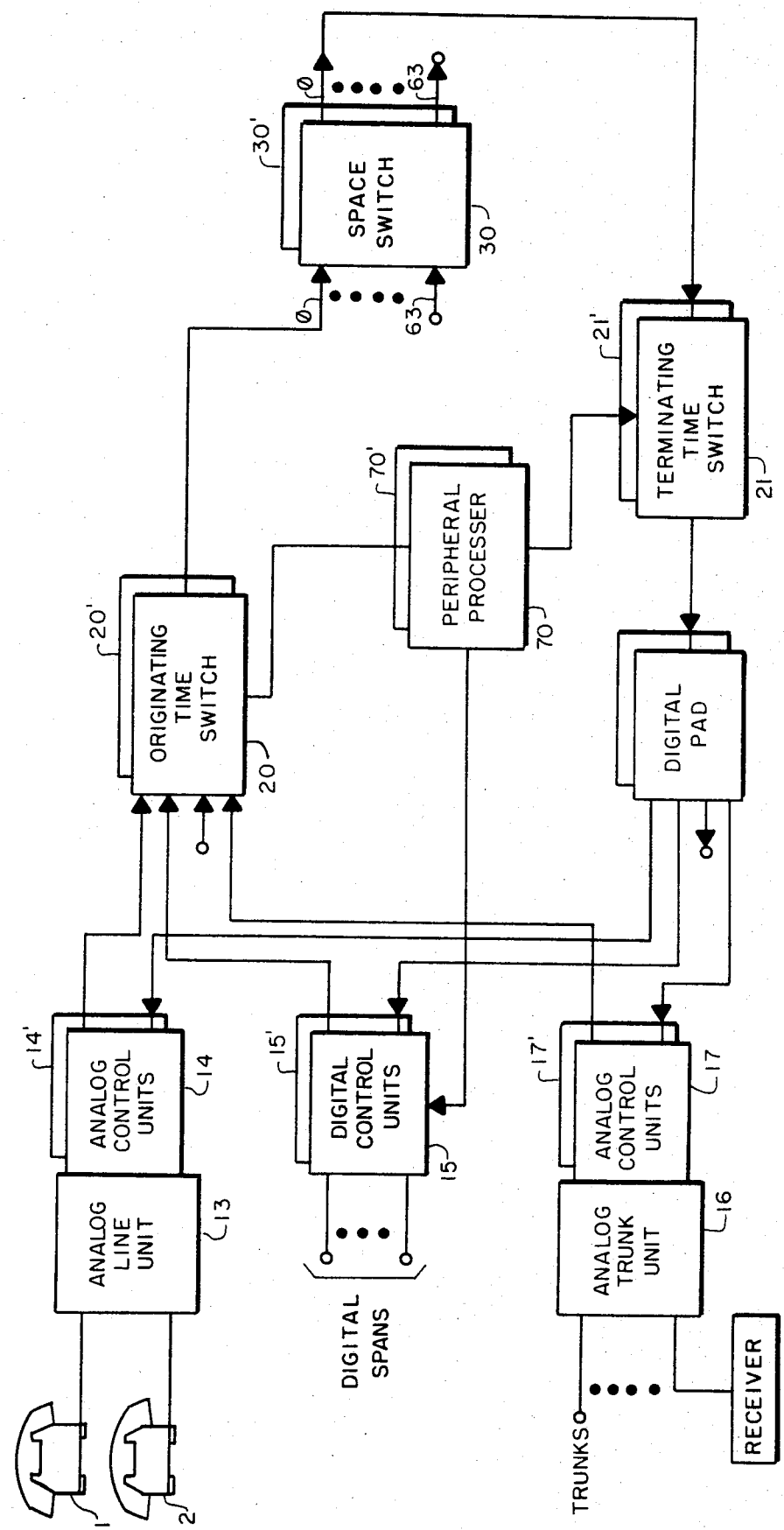
FIG. 1 is a block diagram of the PCM switching system embodying the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using a model 9004 T1 digital span manufactured by GTE Lenkurt Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Other circuitry, not the subject matter of the present application (not shown) strips off from the incoming PCM data the A and B supervisory bit data and simply places the A and B bits in memory locations, one bit per address location or word. The reformatting circuit then arranges this data by packing it 8 bits per word so that the central processor may interrogate these bits with a minimum number of read accesses.

Figure 2A:
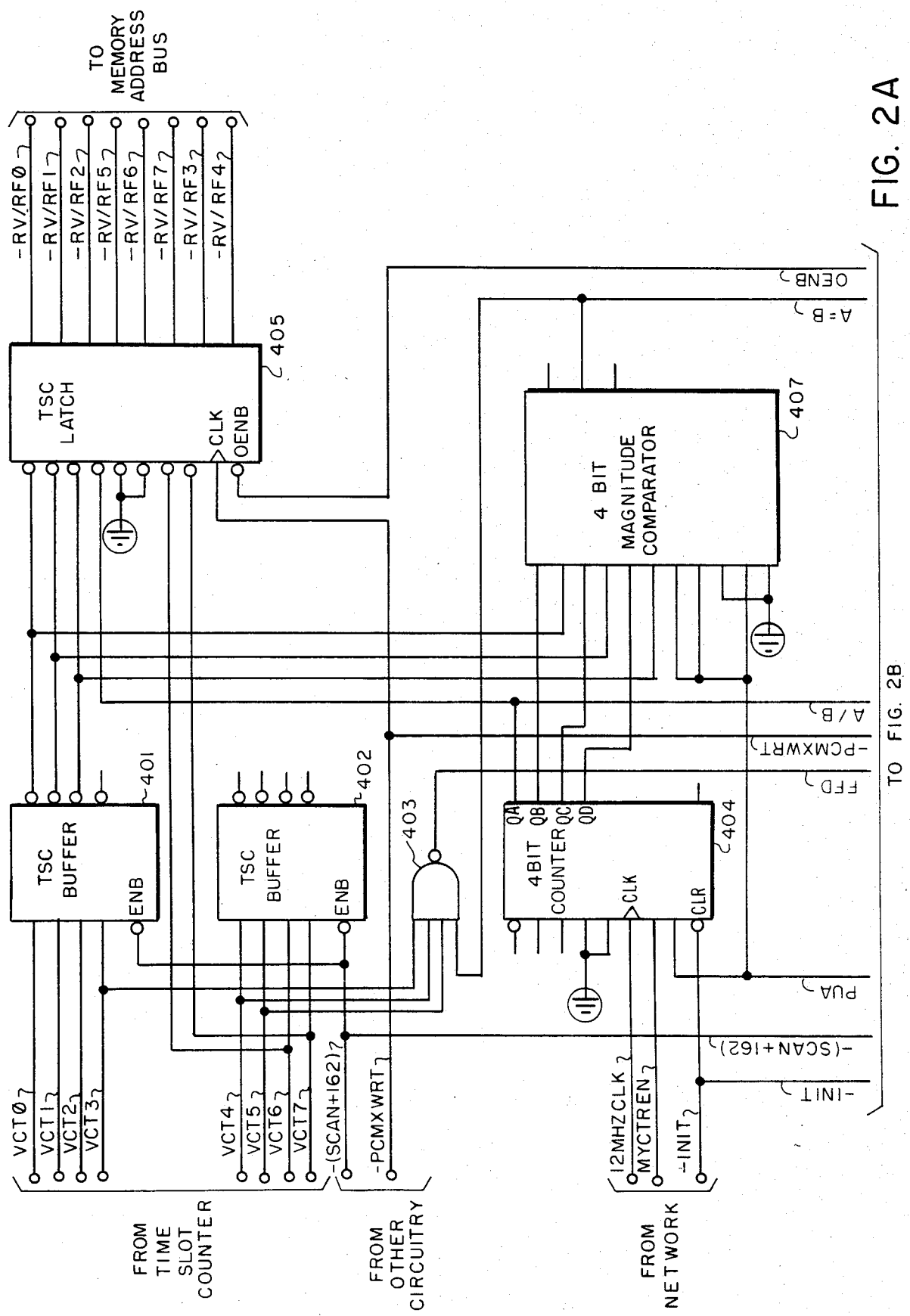

Referring to FIGS. 2A and 2B, time slot counter (TSC) buffers 401 and 402 are connected to the time slot counter 400, which generates the time slot counter signals and transmits it via leads VCT 0 through VCT 7. The time slot counter signals are initialized to a value of 0 and incremented from this value to a value of 191 within a 195 microsecond time period. At that time, the TSC signals are again initialized to 0 and cyclically counts through 191 again, and so on.

The time slot counter signal leads VCT 0–VCT 7 are stable for approximately 240 nanoseconds out of every 648 nanoseconds for one time slot counter. The value of the time slot counter is stored in TSC latch 405. While the time slot counter data is stable, it identifies one of the 192 time slots. Thereby, the value of the time slot counter signals indicates which particular channel and span has A and B supervision data available on leads PCMXLA and PCMXLB, respectively.

Four-bit counter 404 provides a 16 state counter, which controls the reformatting process. During counter state 0, all A supervision bits from digital span 0 are reformatted. During counter state 1, all B supervision bits from digital span 0 are reformatted. During counter state 2, all A supervision bits from digital span 1 are reformatted, etc. Finally, during counter state 15 all B supervision for digital span 7 are reformatted. This 16 state counter is controlled by a signal on lead MYCTREN, which advances the counter through each of the 16 states. It is to be noted that the least significant bit output of counter 404 indicates whether A or B supervision bits are being reformatted. In addition, the three next most significant bits output of counter 404 (QB, QC and QD) indicate which of the 8 digital spans is having its supervision bits reformatted.

Four-bit magnitude comparator 407 matches the identity of the digital span, which is presently having its A and B supervision bits reformatted, with the identity of the digital span that presently has supervision available on the PCMXLA and PCMXLB leads. That is, comparator 407 compares the least significant bits of the time slot counter VCT 0–VCT 2 with the second, third and fourth least significant bits of counter 404, which as mentioned above indicates the identity of the present digital span, which is being reformatted. Four-bit magnitude comparator 407 is connected to counter 404, TSC buffer 401 and TSC latch 405.

When the digital span number, indicated by the time slot counter on leads VCT 0–VCT 2, matches the identity of the digital span being reformatted, as indicated on the QB, QC and QD leads of counter 404, the output of comparator 407 is true. As a result of the comparator 407 output being true and the presence of either the A or B bit, whichever is being collected, the A or B supervision bit is stored into shift register 413. Shift register 413 is an 8-bit universal shift register with tri-state outputs.

The A and B supervision bits are transmitted to AND/NOR gate 409 via the PCMXLA and PCMXLB leads, respectively. The signal indicating whether the A or B bit is present which was derived by counter 404, is transmitted to AND/NOR gate 409 where it is combined with the A and B bits to enable the supervision bits, presently being collected, to be transmitted through inverter 414 to shift register 413.

When 8 of the appropriate kind of supervision bits have been collected by shift register 413, the time slot counter leads VCT 3–VCT 5 will indicate a true condition. In addition, at this time the output of comparator 407 will be true thereby, enabling NAND gate 403 to provide a false condition on its output. NAND gate 403 is connected to flip-flop 408 and the false output of NAND gate 403 will cause the Q output of flip-flop 408 (-REFRMREQ signal) indicating that 8 bits are in the shift register 413 and may be transferred to memory. Simultaneously, the $\overline{Q}$ output of flip-flop 408 goes true producing a true condition on the REFRMREQ lead.

Figure 3:
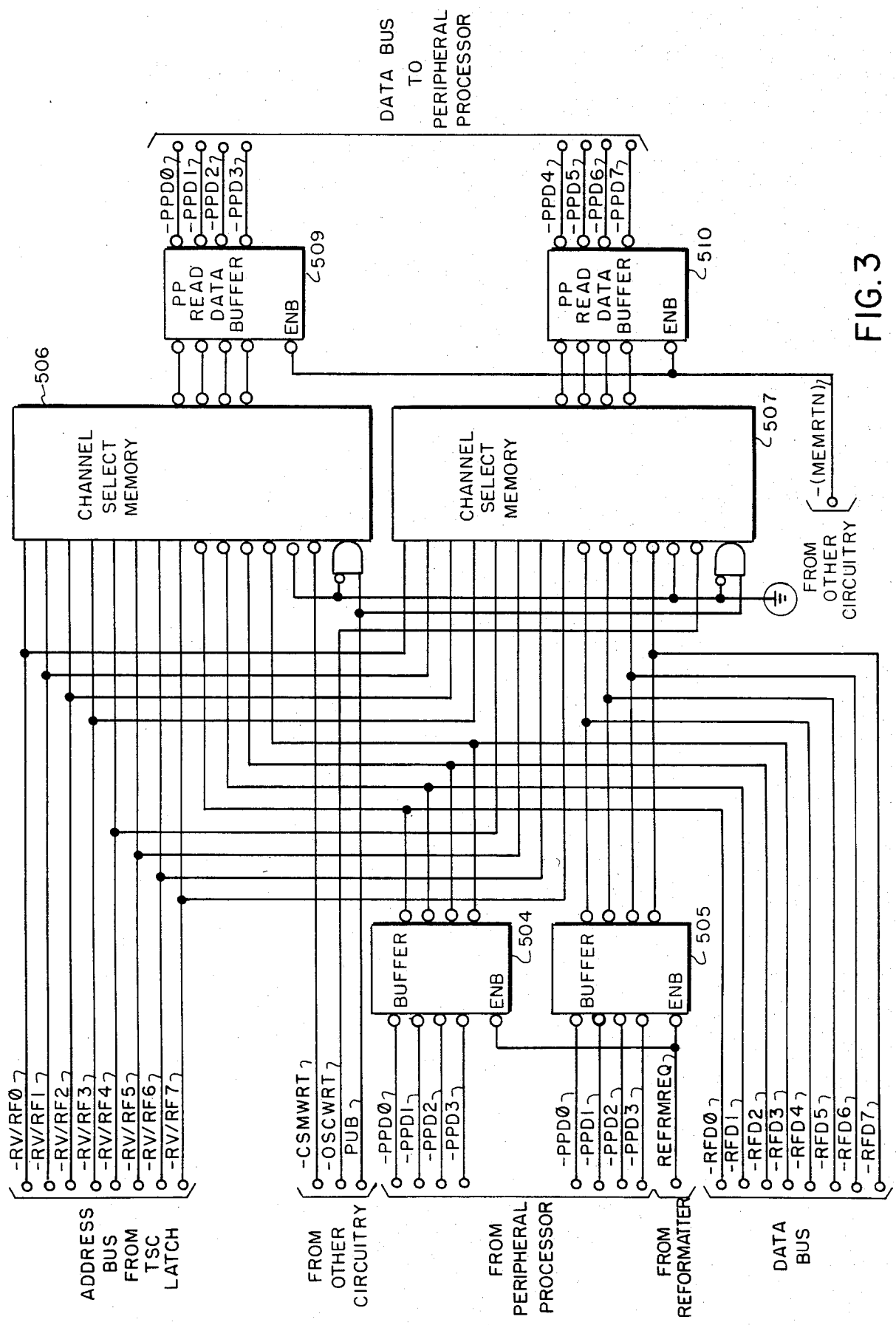
FIG. 3 is a schematic diagram of the memory arrangement for storing the supervision data.

Upon the next occurrence of a signal on lead (SCAN +162), the output of NAND gate 412 will go false thereby, gating the contents of shift register 413 onto the data bus RFD 0 through RFD 7. In addition, the false output of NAND gate 412 will cause the present address, stored in TSC latch 405, to be gated onto the address bus RV/RF 0 through RV/RF 7 of channel select memories 506 and 507, shown in FIG. 3. Channel select memories 506 and 507 are 256×4-bit RAM memories. The reformatted A and B supervision bits may then be read out of the channel select memories 506 and 507 via buffers 509 and 510 which are connected to the peripheral processor via the peripheral processor data bus, PPD 0 through PPD 7. In the above manner, the reformatted A and B supervision bits may be efficiently retrieved by the peripheral processor with a minimum of memory accesses by the CPU.

The supervision bits may be utilized for implementing a nailed connection through the present digital switching system. With the nailed connection the digital switching system is able to connect to other central offices.

FIG. 4 depicts the reformatting of A or B supervisory bits of one particular digital span. The address at which these supervision bits are written into the channel select memories 506 and 507 is determined in the following manner. The three least significant bits are VCT 0–VCT 2. The next two most significant bits are VCT 6 and VCT 7. The next significant bit is the AB signal derived by counter 404. And the two most significant bits of the address are both set to logic 0.

FIG. 5 is a memory diagram of all A and B supervision bits of each of the 8 digital spans.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a PCM telecommunications switching system connected to a plurality of digital spans, said switching system including a CPU, a PCM supervision data reformatting circuit comprising:

said PCM supervision data including an A and a B supervision bit;

means for receiving said PCM supervision data from each of said plurality of digital spans, said means for receiving connected to each of said digital spans;

time slot counter means connected to said means for receiving and to said CPU, said time slot counter means operated to produce a plurality of time slot signals for indicating an identity of a particular digital span and an identity of a particular channel of said particular digital span for which said means for receiving presently has said PCM supervision data;

means for controlling connected to said means for receiving to said time slot counter means and to said CPU and said means for controlling being operated to cyclically produce a plurality of first signals for indicating which particular digital span of said plurality is available for supervision data reformatting, and said means for controlling further operated to produce a second signal of a first value for said A supervision bit and to produce said second signal of a second value for said B supervision bit;

means for formatting connected to said time slot counter means, to said means for receiving and to said means for controlling, said means for formatting operated in response to a bit-for-bit concurrence of a particular number of said plurality of time slot signals with said plurality of first signals to repeatedly collect a plurality of said A supervision bits forming a CPU word or alternatively to repeatedly collect a plurality of said B supervision bits forming a CPU word.

2. A PCM supervision data reformatting circuit as claimed in claim 1, said reformatting circuit further including:

memory means connected to said means for formatting and to time slot counter means, said memory means being operated in response to said CPU word of A supervision bits or alternatively to said CPU word of B supervision bits, to store said CPU words in ordered predefined memory locations; and output means connected to said memory means and operated to buffer said CPU words for subsequent retransmission to said CPU.

3. A PCM supervision data reformatting circuit as claimed in claim 1, said reformatting circuit further including first gating means connected between said means for receiving, said means for formatting and said means for controlling, said first gating means operated to selectively transmit said A supervision bits or said B supervision bits to said means for formatting.

4. A PCM supervision data reformatting circuit as claimed in claim 1, said means for receiving including:

a first connection for transmitting said A supervision bits; and a second connection for transmitting said B supervision bits.

5. A PCM supervision data reformatting circuit as claimed in claim 2, said time slot counter means including:

a time slot counter;

time slot counter buffer means connected to said time slot counter; and time slot counter latch means connected between said time slot counter buffer means and said memory means, said time slot counter latch means being operated to produce a memory address for storing each said CPU word.

6. A PCM supervision data reformatting circuit as claimed in claim 5, said means for controlling including counter means connected to said reformatting means, to said first gating means and to said time slot counter latch means, said counter means operated to transmit said second signal to said first gating means and to said time slot counter latch means, said counter means further operated to transmit said plurality of first signals to said means for formatting.

7. A PCM supervision data reformatting circuit as claimed in claim 6, said means for formatting including:

comparator means connected to said counter means via a plurality of leads providing said plurality of first signals, said comparator means further connected to said time slot counter buffer means via a plurality of leads providing at least three of said time slot counter signals; and shift register means connected to said comparator means, to said first gating means and to said memory means for transmitting said collected CPU word to said memory means for storage.

8. A PCM supervision data reformatting circuit as claimed in claim 7, said reformatting circuit further including second gating means connected to said time slot counter, to said comparator means and to said memory means for providing a reformat signal request to said memory means, indicating said CPU word is available for storage.

9. A PCM supervision data reformatting circuit as claimed in claim 2, said memory means including at least one random access memory device.

10. A PCM supervision data reformatting circuit as claimed in claim 9, said output means being connected to said CPU for transmission of said stored CPU words from said random access memory device to said CPU.

11. A PCM supervision data reformatting circuit as claimed in claim 3, said first gating means including:

AND/NOR gating means connected to said means for receiving and to said means for controlling; and inverter means connected between said AND/NOR gating means and said means for formatting.

12. A PCM supervision data reformatting circuit as claimed in claim 8, said second gating means including:

first NAND gating means connected to said time slot counter and said comparator means;

flip-flop means connected to said first NAND gating means; and second NAND gating means connected to said flip-flop means and to said memory means.

* * * * *